US009049331B2

(12) United States Patent
Nasu

(10) Patent No.: US 9,049,331 B2
(45) Date of Patent: Jun. 2, 2015

(54) ELECTRONIC DEVICE AND COMPUTER PROGRAM PRODUCT

(75) Inventor: Masami Nasu, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 274 days.

(21) Appl. No.: 13/603,873

(22) Filed: Sep. 5, 2012

(65) Prior Publication Data

US 2013/0061074 A1 Mar. 7, 2013

(30) Foreign Application Priority Data

Sep. 5, 2011 (JP) .................................. 2011-192623

(51) Int. Cl.
*H04N 1/00* (2006.01)
*G06F 1/32* (2006.01)

(52) U.S. Cl.
CPC .......... *H04N 1/00896* (2013.01); *G06F 1/3206* (2013.01); *G06F 1/3287* (2013.01)

(58) Field of Classification Search
CPC . H04N 1/00896; G06F 1/3209; G06F 1/3287; G06F 1/3206
USPC ................. 713/320, 323, 324; 358/1.14, 1.15; 359/17, 201.1; 455/574; 709/220, 223
See application file for complete search history.

(56) References Cited

U.S. PATENT DOCUMENTS

| 7,809,966 B2 * | 10/2010 | Imao ............................. 713/320 |
| 8,001,404 B2 * | 8/2011 | Pathak ......................... 713/320 |
| 8,238,279 B2 * | 8/2012 | Stahl ............................. 370/311 |
| 8,331,995 B2 * | 12/2012 | Hevizi et al. .................. 455/574 |
| 8,743,763 B2 * | 6/2014 | Patil et al. ..................... 370/311 |
| 2011/0292975 A1 * | 12/2011 | Kuwahara ..................... 375/219 |

FOREIGN PATENT DOCUMENTS

| JP | 10-290351 | 10/1998 |
| JP | 2000-125030 | 4/2000 |
| JP | 2000-295386 | 10/2000 |
| JP | 2003-140786 | 5/2003 |
| JP | 2003-283738 | 10/2003 |

* cited by examiner

*Primary Examiner* — Stefan Stoynov
(74) *Attorney, Agent, or Firm* — Oblon, McClelland, Maier & Neustadt, L.L.P.

(57) ABSTRACT

An electronic device has, as operation modes, a first mode and a second mode reduced in power consumption from the first mode. The electronic device includes a main unit an operation of which is suppressed in the second mode; and a sub-unit. The sub-unit includes a communicating unit that performs communication via a communication line; and an operation mode controller that changes the operation modes from the second mode to the first mode when the communication with a predefined prescribed device is requested during the second mode and changes the operation modes from the first mode to the second mode at a timing corresponding to termination of the communication.

11 Claims, 7 Drawing Sheets

ELECTRONIC DEVICE AND COMPUTER PROGRAM PRODUCT

CROSS-REFERENCE TO RELATED APPLICATIONS

The present application claims priority to and incorporates by reference the entire contents of Japanese Patent Application No. 2011-192623 filed in Japan on Sep. 5, 2011.

BACKGROUND OF THE INVENTION

1. Field of the Invention

The present invention relates to an electronic device and a computer program product that have, as operation modes, a normal mode and an energy-saving mode reduced in power consumption as compared with that of the normal mode.

2. Description of the Related Art

In a conventional image forming apparatus like a multi-function printer (MFP) that implements a plurality of functions such as a scanner function, a printer function, a copying function, and a facsimile function in a single housing, the power consumption in a standby state and others is reduced to achieve energy conservation. Furthermore, monitoring the status of the image forming apparatus is performed conventionally by remote management that uses communication.

As the communication applicable for the remote management of an image forming apparatus, known is a communication method that uses Transmission Control Protocol/Internet Protocol (TCP/IP) as a communication protocol. As one example, by connecting an image forming apparatus and a management device remotely located with respect to the image forming apparatus through a network such as a local area network (LAN), the communication between the image forming apparatus and the management device is performed using the TCP/IP. A given command and others is then transmitted from the management device to the image forming apparatus, and a response of the image forming apparatus to the transmitted command is received by the management device, whereby monitoring of the status of the image forming apparatus by remote operation can be implemented.

In an image forming apparatus, a technique in which TCP/IP processing is performed in the kernel of an operating system (OS) is already known. Furthermore, there is a known technique in which TCP/IP processing is sub-systematized (chipped) in the kernel of an OS and the power is supplied to the sub-system even when a main system is in a power-off state (an energy-saving state). In this case, a packet transmitted from the outside through a network is detected by the sub-system, and the sub-system controls the power to the main system so as to return the main system to a normal state from the energy-saving state.

FIG. 8 illustrates an example of a configuration of an image forming apparatus 400 in conventional technology. The image forming apparatus 400 is connected with a controller 430, a sub-system 440, and a power supply unit (PSU) 470. The PSU 470 supplies the power to the controller 430 and the sub-system 440 in accordance with the control of a power controller 445, which will be described later.

The controller 430 includes a main central processing unit (CPU) 415, a synchronous dynamic random-access memory (SDRAM) 411, a flash memory 412, a hard disk drive (HDD) 413, a remote management system memory 417, and a peripheral component interconnect bus (PCI) 448, and the foregoing are connected to an application specific integrated circuit (ASIC) 416 to communicate with one another.

Likewise, connected to the ASIC 416 are an operation panel 414, an FCU 421, a plotter/scanner engine unit 424, and data I/Fs 422 and 423 each corresponding to, for example, universal serial bus (USB) and Institute of Electrical and Electronics Engineers (IEEE) 1394. The FCU 421 performs facsimile communication in accordance with G3 standard or G4 standard. The plotter/scanner engine unit 424 performs a printer function and a scanner function. A peripheral device 425 is, for example, an automatic document feeder (ADF) and is used, in the housing of the image forming apparatus 400, being attached to a printer/scanner portion. The ASIC 416 provides sharing of the respective units connected that are objects of the control of the main CPU 415, and mediates data transfer performed among the respective units.

The main CPU 415 controls the operation of the respective units connected to the ASIC 416 in accordance with a program and others stored in advance in the flash memory 412 or the HDD 413 using the SDRAM 411 as a work memory. For example, the main CPU 415 controls the FCU 421 and the plotter/scanner engine unit 424, in response to user operation performed on the operation panel 414, to perform functions such as facsimile communication, printing, and copying.

The PCI 448 is connected with a modem 401 that performs communication through a public telephone network 500. The remote operation of the image forming apparatus 400 through the public telephone network 500 is performed by the communication with the modem 401 using the remote management system memory 417.

The sub-system 440 includes a sub-CPU 441, a random access memory (RAM) 442, a read only memory (ROM) 443, a remote management system memory 444, the power controller 445, and a PCI 446, and the foregoing are connected to communicate with one another by an interface ASIC 447. The interface ASIC 447 provides sharing of the respective units connected that are objects of the control of the sub-CPU 441, and mediates data transfer performed among the respective units.

The sub-CPU 441 controls the operation of the respective units connected to the interface ASIC 447 in accordance with a program stored in advance in the ROM 443 using the RAM 442 as a work memory. The power controller 445 controls the operation of the PSU 470. Furthermore, a network interface card (NIC) 402 that controls connection to a network such as a local area network (LAN) and the Internet is connected to the PCI 446.

In the image forming apparatus 400 thus configured, when the operation of the image forming apparatus 400 is in an energy-saving mode, under the control of the power controller 445, for example, the supply of power to the controller 430 is set to off and the power is supplied only to the sub-system 440. During the energy-saving mode, when a packet transmitted to the image forming apparatus 400 through the network is received by the NIC 402, the sub-CPU 441 is notified of that via the PCI 446 and the interface ASIC 447. The sub-CPU 441 then, in response to the notice, controls the power controller 445 to turn on the supply of power to the controller 430.

In the image forming apparatus 400 in conventional technology illustrated in FIG. 8, contemplated is only a situation in which a packet is received from an external management device. Now, considered is a remote management system that performs dial-up communication with a management device by the modem 401 using the TCP/IP and Point-to-Point Protocol (PPP) through the public telephone network 500. In the remote management system, PPP processing is performed by the kernel of the OS in the managed functions of the image forming apparatus 400. Therefore, any of the following restrictions arise.

Firstly, in order to respond to an incoming call from the external management device and to perform dial-up communication as needed, the power to the controller 430 must always be set to on. Secondly, if the operation mode of the image forming apparatus 400 is in the energy-saving mode and thus the power to the controller 430 is set to off, the image forming apparatus 400 cannot respond to an incoming call from the external management device.

In this regard, Japanese Patent Application Laid-open No. 2000-295386 discloses a device with an energy-saving mode that temporarily changes a return condition by confirmation control so as not to return to a normal mode from the energy-saving mode depending on a signal transmitted from an ISDN network. In accordance with Japanese Patent Application Laid-open No. 2000-295386, by the confirmation control of incoming mail during the energy-saving mode, unnecessarily returning to the normal mode is prevented, whereby an energy-saving effect by the energy-saving function can be achieved effectively.

Furthermore, there has been a proposed technique in which communication from the outside is detected during an energy-saving mode and the operation modes are automatically returned to a normal mode from the energy-saving mode when the detected communication is from a prescribed device.

Meanwhile, in a device having an energy-saving mode as in the foregoing, the change in operation mode from the normal mode to the energy-saving mode is often performed automatically corresponding to the presence of a request to the device from the outside such as user operation. More specifically, the length of time in which user operation is not performed in the normal mode is measured, and when the measured time comes to a given length of time, the operation mode is automatically changed to the energy-saving mode.

The same applies when the operation mode is automatically returned to the normal mode from the energy-saving mode in response to the request made from the external management device and others through the communication. In this case, conventionally, the operation mode is not changed to the energy-saving mode unless a given time is passed from the time the operation mode is returned to the normal mode, and thus it takes time until the operation mode is returned to the energy-saving mode.

Particularly, because the communication with the external device occurs at a timing not intended by the user of the device, an ideal energy-saving effect may not be achieved.

Therefore, there is a need for an electronic device capable of enhancing the energy-saving effect, when returning from the energy-saving mode that is caused by the communication from the external device.

SUMMARY OF THE INVENTION

According to an embodiment, there is provided an electronic device has, as operation modes, a first mode and a second mode reduced in power consumption from the first mode. The electronic device includes a main unit an operation of which is suppressed in the second mode; and a sub-unit. The sub-unit includes a communicating unit that performs communication via a communication line; and an operation mode controller that changes the operation modes from the second mode to the first mode when the communication with a predefined prescribed device is requested during the second mode and changes the operation modes from the first mode to the second mode at a timing corresponding to termination of the communication.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Configuration Applicable to Embodiment

Figure 1:
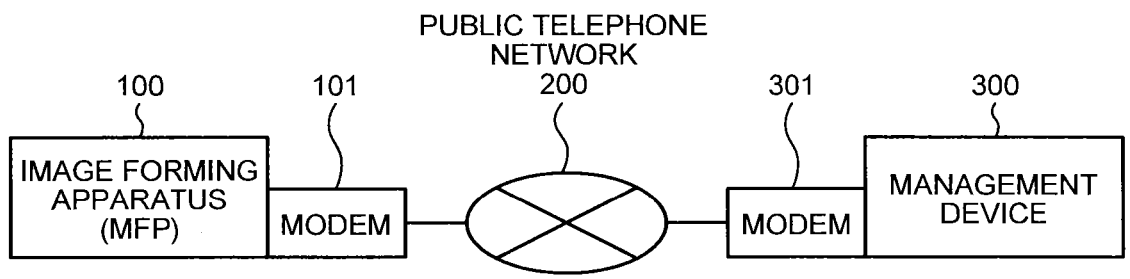
FIG. 1 is a block diagram schematically illustrating a configuration of a remote management system applicable to an embodiment.

With reference to the accompanying drawings, an embodiment of an electronic device and a control method of an electronic device will be described in detail in the following. FIG. 1 schematically illustrates a configuration of a remote management system applicable to the embodiment. An image forming apparatus 100 is, for example, a multifunction printer (MFP) that realizes a plurality of functions such as a printing function, a scanner function, and a facsimile communication function in a single housing. A management device 300 is, for example, a commonly-used computer. The image forming apparatus 100 and the management device 300 are connected with modems 101 and 301, respectively, supporting, for example, AT commands and are enabled to communicate with each other through a public telephone network 200 by the modems 101 and 301. The management device 300 can perform, by the communication using the modem 301, the remote management of the image forming apparatus 100 through the public telephone network 200.

FIG. 1 illustrates that one image forming apparatus 100 is connected to the public telephone network 200 and one management device 300 manages this image forming apparatus 100. However, it is not limited to this example. More specifically, a plurality of image forming apparatuses 100 may be connected to the public telephone network 200 and one management device 300 may be configured to manage these image forming apparatuses 100.

In the remote management system, to realize remote operation of the image forming apparatus 100 by the management device 300, both the management device 300 and the image forming apparatus 100 are made to transmit and receive a request and a response of the process for a method of a mutually implemented application by remote procedure call (RPC). Both the management device 300 and the image forming apparatus 100 are implemented with protocols such as Point-to-Point Protocol (PPP), Transmission Control Protocol/Internet Protocol (TCP/IP), Simple Object Access Protocol (SOAP), and Hyper Text Transfer Protocol (HTTP), and after a PPP connection is established, the RPC is realized by performing TCP/IP and SOAP/HTTP communication.

In the PPP connection, due to security considerations, packet communication with the image forming apparatus 100 directly from the outside is prohibited. To perform the remote management of the image forming apparatus 100 by the management device 300, for example, the management device 300 calls up the image forming apparatus 100 by dial-up, and the image forming apparatus 100 disconnects the line after the call is received and then calls up a specified party (the management device 300) held in the image forming apparatus 100.

Figure 2:
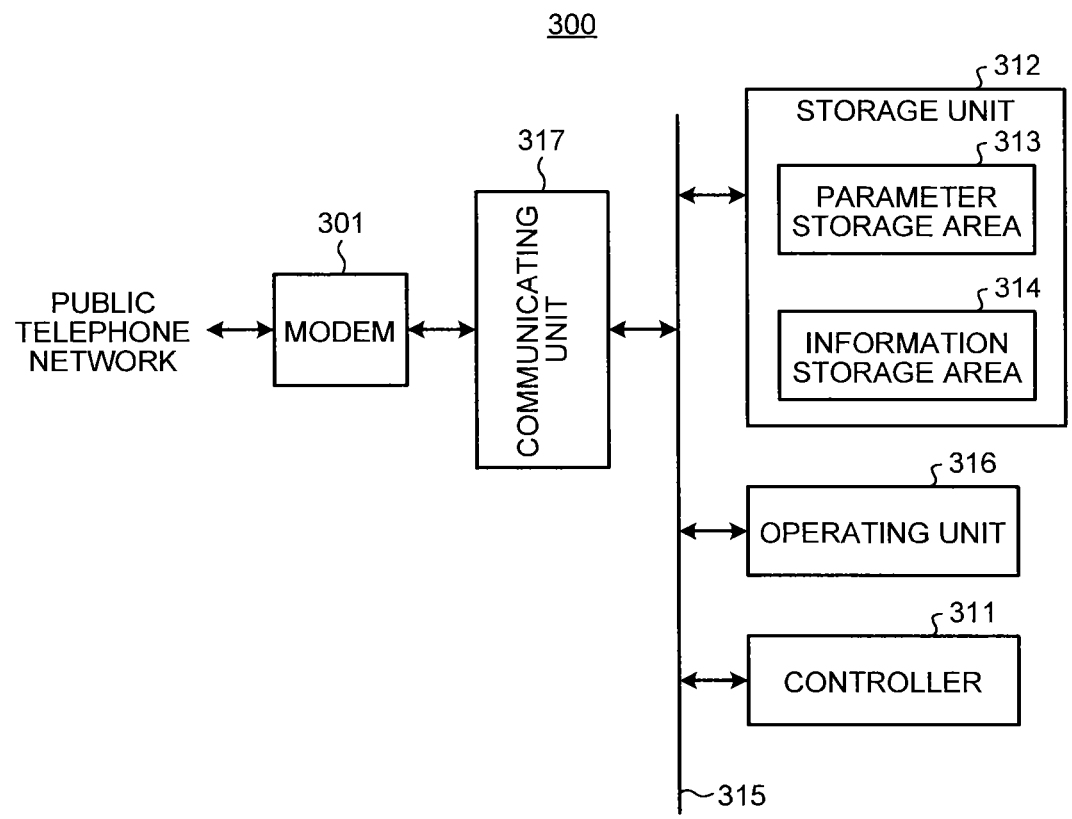
FIG. 2 is a block diagram illustrating an example of a configuration of a management device applicable to the embodiment.

FIG. 2 illustrates an example of a configuration of the management device 300 applicable to the present embodiment. The management device 300 can be configured using a commonly-used computer. In the example in FIG. 2, the management device 300 includes a controller 311, a storage unit 312, a bus 315, an operating unit 316, and a communicating unit 317. The communicating unit 317 is connected with the modem 301.

The controller 311 includes a central processing unit (CPU), a read only memory (ROM), a random access memory (RAM), a hard disk drive (HDD), and others, and the CPU controls the operation of the whole management device 300 in accordance with a program stored in advance in the HDD or the ROM using the RAM as a work area. The operating unit 316 includes a pointing device such as a mouse, a keyboard, and a display unit so as to receive user operation and to provide information to the user.

The storage unit 312 is composed of, for example, an HDD and a non-volatile semiconductor memory, and has a parameter storage area 313 and an information storage area 314. The parameter storage area 313 stores therein data entered by the user operation performed through the operating unit 316. The information storage area 314 stores therein, for example, information of a managed device such as the image forming apparatus 100.

The communicating unit 317 controls the modem 301 in accordance with commands from the controller 311 to perform communication with the image forming apparatus 100 that is a managed device through the public telephone network 200.

Figure 3:
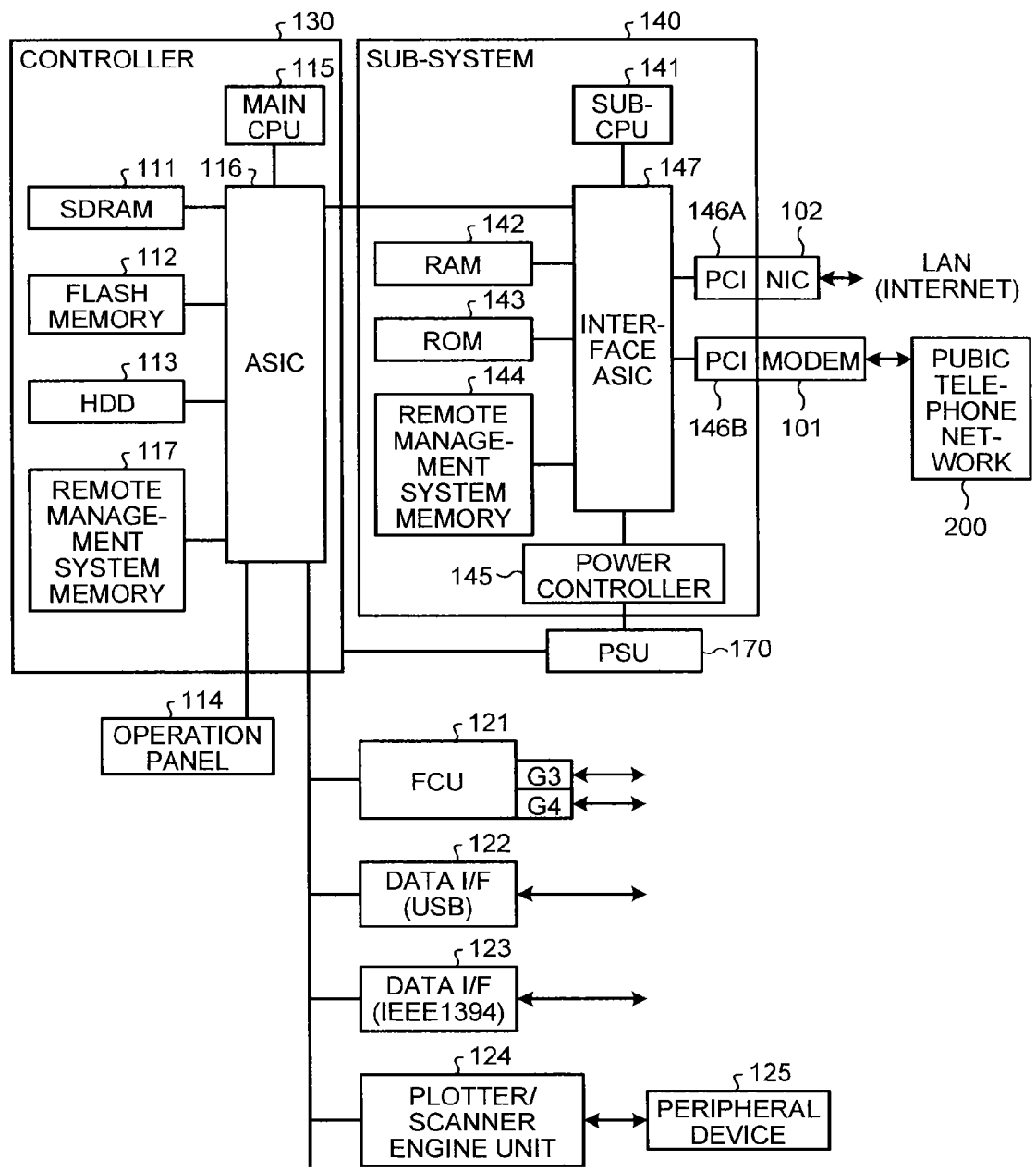
FIG. 3 is a block diagram illustrating an example of an image forming apparatus as an electronic device applicable to the embodiment.

FIG. 3 illustrates an example of a configuration of the image forming apparatus 100 as an electronic device applicable to the present embodiment. The image forming apparatus 100 includes a controller 130 that is a main unit, and a sub-system 140 that is a sub-unit. A power supply unit (PSU) 170 supplies power to the controller 130 and the sub-system 140 in accordance with the control of a power controller 145 described later.

The controller 130 is a portion that performs main operation of the image forming apparatus 100, and includes a main CPU 115, a synchronous dynamic random-access memory (SDRAM) 111, a flash memory 112, an HDD 113, and a remote management system memory 117, and the foregoing are connected to communicate with one another by an application specific integrated circuit (ASIC) 116.

The SDRAM 111 stores therein various programs, and is a memory used by the main CPU 115 when the main CPU 115 performs processing. The flash memory 112 is a non-volatile semiconductor memory, and stores therein a boot program and an operating system (OS) image in advance. The flash memory 112 further stores therein various types of data required to be non-volatile, for example, a model name, a model number, and an IP address of the image forming apparatus 100.

The remote management system memory 117 stores therein information used for the remote management of the image forming apparatus 100. For example, the remote management system memory 117 stores therein the information indicative of a status of the controller 130. The status information includes, for example, operating histories of a plotter/scanner engine unit 124 and an FCU 121 described later. The information stored in the remote management system memory 117 is updated each time the status of the controller 130 is changed in the image forming apparatus 100.

Furthermore, connected to the ASIC 116 are an operation panel 114, the FCU 121, the plotter/scanner engine unit 124, and data I/Fs 122 and 123 each corresponding to, for example, universal serial bus (USB) and Institute of Electrical and Electronics Engineers (IEEE) 1394. A peripheral device 125 is, for example, an automatic document feeder (ADF), and is used, in the housing of the image forming apparatus 100, being attached to a printer/scanner portion. The ASIC 116 provides sharing of the respective units connected that are objects of the control of the main CPU 115, and mediates data transfer performed among the respective units.

The FCU 121 performs, in accordance with the control of the controller 130, facsimile communication according to G3 standard or G4 standard. The plotter/scanner engine unit 124 implements, in accordance with the control of the controller 130, a printer function and a scanner function. The operation panel 114 includes operators to receive user operation and a display unit to provide the user with information.

The main CPU 115 controls the operations of the respective units connected to the ASIC 116 in accordance with a program and others stored in advance in the flash memory 112 or the HDD 113 using the SDRAM 111 as a work memory. For example, the main CPU 115, in response to the user operation performed on the operation panel 114, controls the FCU 121 and the plotter/scanner engine unit 124 to perform functions such as facsimile communication, printing, and copying.

The sub-system 140 includes a sub-CPU 141, a RAM 142, a ROM 143, a remote management system memory 144, the power controller 145, and peripheral component interconnect buses (PCIs) 146A and 146B, and the forgoing are connected to communicate with one another by an interface ASIC 147. The interface ASIC 147 provides sharing of the respective units connected that are objects of the control of the sub-CPU 141, and mediates data transfer performed among the respective units.

The sub-CPU 141 controls the operations of the respective units connected to the interface ASIC 147 in accordance with a program stored in advance in the ROM 143 using the RAM 142 as a work memory. The power controller 145 controls the operation of the PSU 170. The remote management system memory 144 backs up the status information of the controller 130 that is stored in the remote management system memory 117 of the controller 130. The remote management system memory 144 further stores therein identification information of the management device 300 that performs the remote management of the image forming apparatus 100. The identification information of the management device 300 is, for example, a caller telephone number (a caller number) of the management device 300 (the modem 301).

The PCI 146A is connected with a network interface card (NIC) 102 that controls connection to a network such as a local area network (LAN) and the Internet. The PCI 146B is connected with the modem 101 that performs communication through the public telephone network 200. The image forming apparatus 100 performs communication with the management device 300 through the public telephone network 200 using the modem 101 to receive the remote management by the management device 300.

The sub-CPU 141 of the sub-system 140 and the main CPU 115 of the controller 130 are made to communicate with each other via the interface ASIC 147 and the ASIC 116, respectively.

Figure 4:
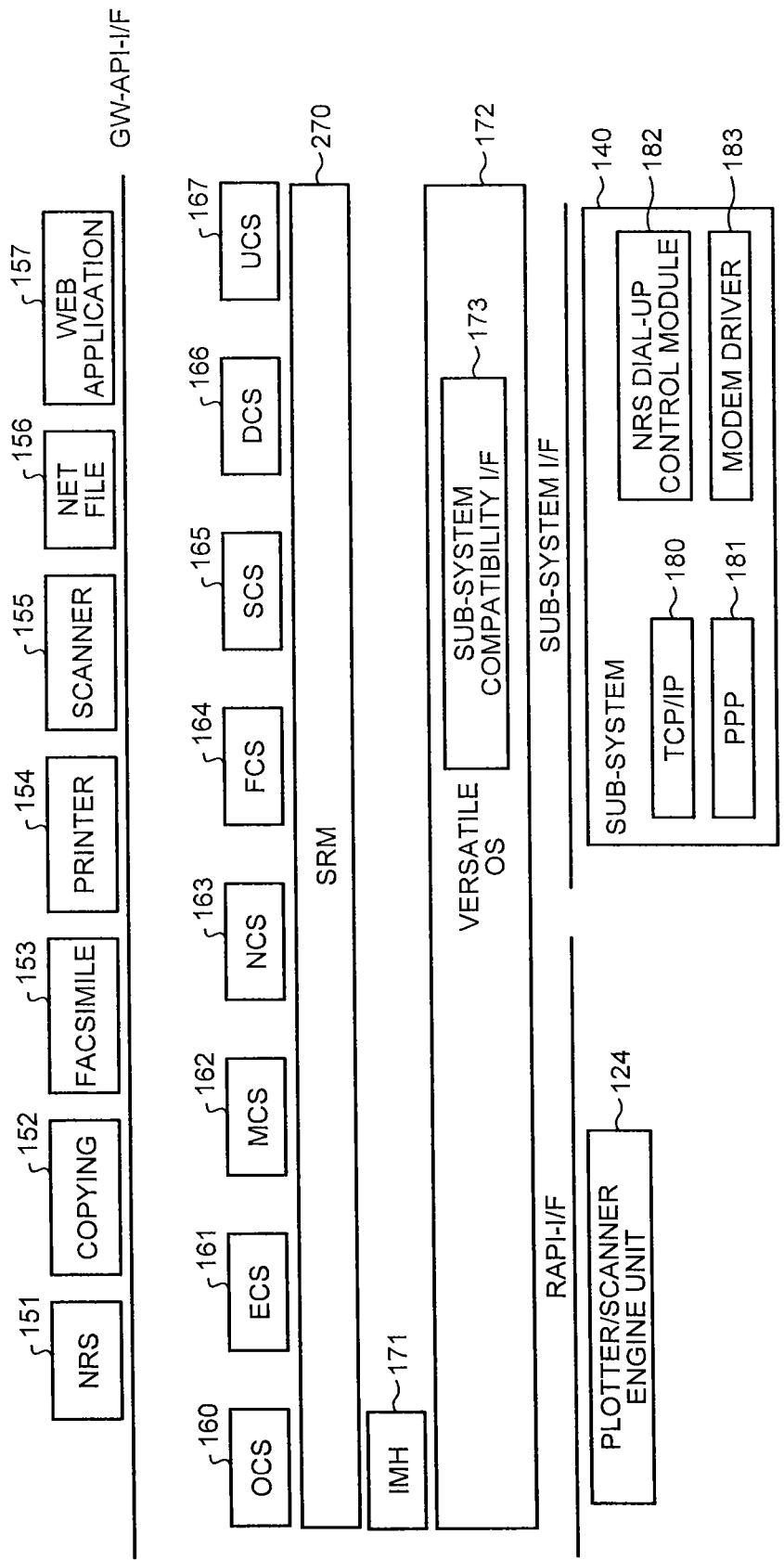
FIG. 4 is a diagram schematically illustrating an example of a software configuration of the image forming apparatus applicable to the embodiment.

FIG. 4 illustrates an example of a software configuration of the image forming apparatus 100. The software of the controller 130 has an application module layer, a service module layer, and a versatile OS layer. The application module layer includes application modules to use various functions of the image forming apparatus 100. In this example, the application module layer includes a new remote service (NRS) application 151 to use an NRS, a copy application 152 to use a copying function, a facsimile application 153 to use a facsimile function, a printer application 154 to use a printer function, a scanner application 155 to use a scanner function, a network file application 156 to use a network file function, and a web application 157 to use an application on a web.

The NRS application 151 has a function concerning remote management through a network such as conversion of data when transmitting and receiving the data through the network and a scheduler function. More specifically, the NRS application 151 has a function to notify the management device 300 of information indicative of status of a managed device including information of various counters, and of information indicative of firmware version. The NRS application 151 further has a function to transmit requests such as a firmware update or command execution in units of method. Furthermore, the NRS application 151 has a function to perform an abnormality report, a supply report, and an activation report to the management device 300 on a regular basis or at given timing.

The service module layer includes various service programs to use the respective applications in the application module layer. More specifically, the service module layer includes an OCS module 160 that controls the operation panel 114, an ECS module 161 that controls an engine unit (the plotter/scanner engine unit 124), an MCS module 162 that performs memory control, an NCS module 163 that causes a mediation process between the network and each of the applications in the application module layer to be performed, an FCS module 164 that realizes the facsimile function, an SCS module 165 that performs activation management and termination management of the respective applications in the application layer corresponding to command content, a DCS module 166 that transmits and receives an image file stored in the HDD or a memory on a controller board using Simple Mail Transfer Protocol (SMTP) and File Transfer Protocol (FTP), and a UCS module 167 that manages address information registered by a device user, user information corresponding to the address information, and others.

The service module layer further includes an SRM module 270 and an IMH module 171 that perform mediation between each of the above-described modules and a versatile OS. More specifically, the SRM module 270 performs system control and resource management. The IMH module 171 manages a memory that temporarily stores therein image data.

A versatile OS 172 is, for example, an operating system such as Unix (registered trademark) and Linux (registered trademark). The versatile OS 172 performs mediation between the service module layer and hardware (the plotter/scanner engine unit 124) via a remote application programming interface (RAPI)-I/F. The versatile OS 172 further includes a sub-system compatibility I/F 173, and performs mediation between the service module layer and the sub-system 140 via a sub-system I/F.

In the controller 130, each of the programs makes the main CPU 115, via the ASIC 116, run a boot program in the flash memory 112, read out an OS image, and then load the OS image read out onto the SDRAM 111 to expand the OS image as the versatile OS 172 so as to launch the versatile OS 172. Furthermore, as the need arises, a program such as each of the applications and services in the flash memory 112 can be read out, loaded onto the SDRAM 111 to expand and launch the program so as to implement the respective functions.

The sub-system 140 includes TCP/IP 180, PPP 181, an NRS dial-up control module 182, a modem driver 183, and others, and provides sharing of communication system devices. The sub-system 140 further includes an OS independent from the versatile OS 172 (not illustrated).

In the sub-system 140, as the same as those in the controller 130, each of the programs makes the sub-CPU 141, via the interface ASIC 147, run a boot program in the ROM 143, read out an OS image, and then load the OS image read out onto the RAM 142 to expand the OS image as an OS so as to launch the OS. Additionally, as the need arises, a program such as each of the applications and services in the ROM 143 can be read out, loaded onto the RAM 142 to expand and launch the program so as to realize the respective functions.

Operation Mode Changing Process

Now, the process of changing operation modes from a normal mode to an energy-saving mode will be schematically described. The image forming apparatus 100 in the normal mode, by a user operation performed on the operation panel 114 or by a request from the user through a network such as a LAN, activates the FCU 121 and the plotter/scanner engine unit 124 to perform an operation of the function such as the facsimile communication function, printing function, copying function, or scanning function. In such a situation where the operation of the function in the image forming apparatus 100 is performed by the user request, if there is no further request present to perform any function until a predetermined change wait time is passed after the operation is performed, the image forming apparatus 100 changes the operation mode from the normal mode to the energy-saving mode. The predetermined change wait time in this case is, for example, approximately from a few minutes to a few dozen minutes.

Communication Procedure

Figure 5:
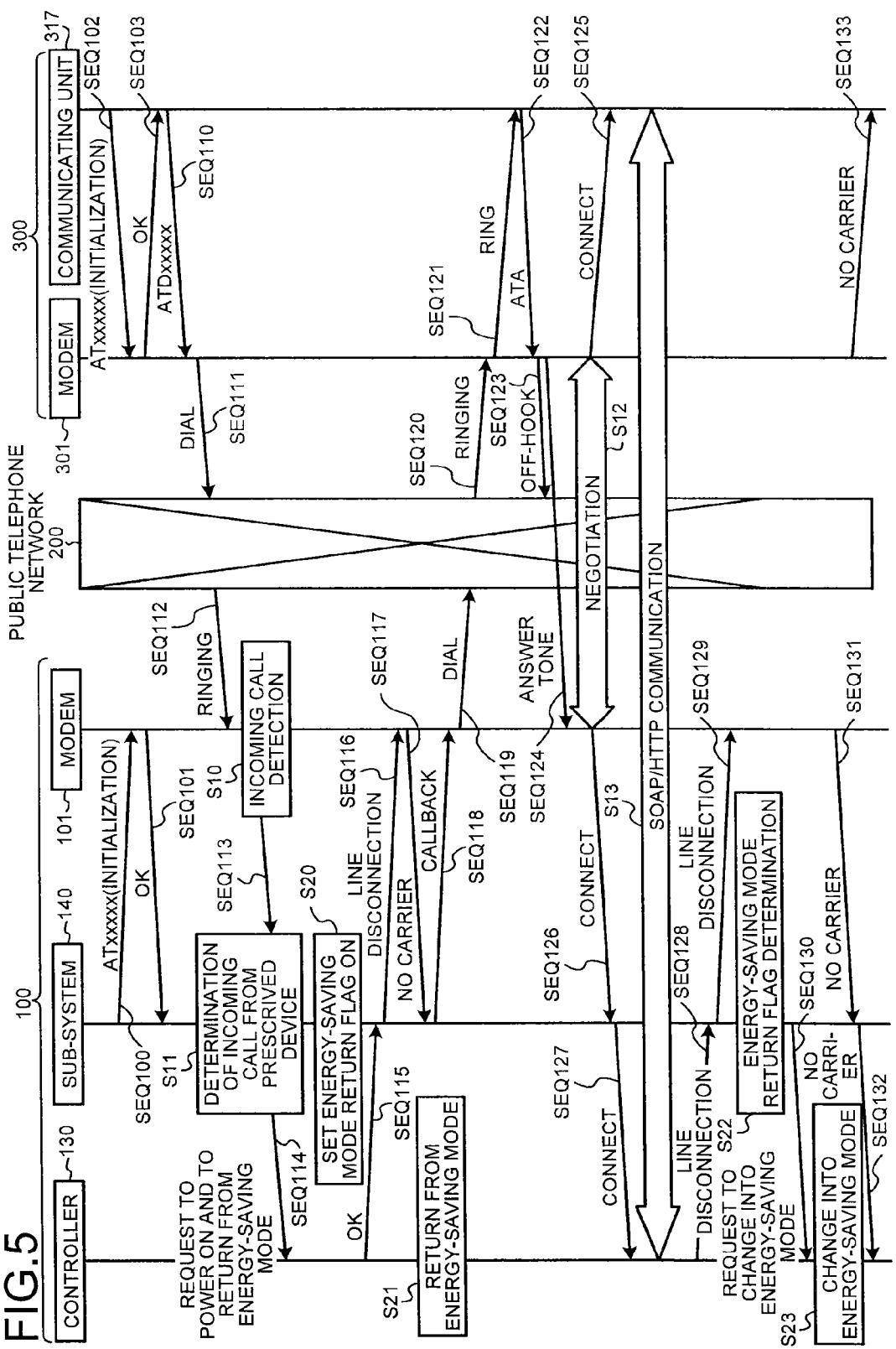
FIG. 5 is a sequence diagram illustrating an example of a communication procedure performed between the management device and the image forming apparatus in the embodiment.

FIG. 5 illustrates an example of a communication procedure performed between the management device 300 and the image forming apparatus 100 in the present embodiment. As a precondition to perform communication in the present embodiment, in the image forming apparatus 100, the sub-CPU 141 of the sub-system 140 outputs an AT command for initialization to the modem 101 so as to perform initialization for data communication performed by the modem 101 (SEQ100 and SEQ101). Likewise, in the management device 300, the communicating unit 317 outputs an AT command for initialization to the modem 301 so as to perform initialization for data communication performed by the modem 301 (SEQ102 and SEQ103). Such initialization operations make the modem 101 of the image forming apparatus 100 and the modem 301 of the management device 300 connectable through the public telephone network 200.

It is assumed here that, after the initialization, the operation mode of the image forming apparatus 100 is changed to the energy-saving mode. In the energy-saving mode, the sub-system 140 suppresses the operation of the controller 130, thereby cutting down the power consumption in the controller 130 and in the FCU 121 and the plotter/scanner engine unit 124 that are controlled by the controller 130.

The suppression of operation of the controller 130 can be realized, for example, by suppressing the power supply to the controller 130. More specifically, when the operation mode is changed into the energy-saving mode in the image forming apparatus 100, for example, in the sub-system 140, the sub-CPU 141 gives a command to the power controller 145 to suppress the power supply to the controller 130. The power controller 145 controls the PSU 170 in response to the command so as to suppress the power supply (for example, halting the power supply) to the controller 130.

The suppression of operation of the controller 130 is not limited to the suppression of the power supply to the controller 130. For example, during the energy-saving mode, setting a clock frequency of a clock signal for controlling the operation of the controller 130 lower than that in the normal mode suppresses the operation of the controller 130, whereby the power consumption can be reduced. Furthermore, a portion to which the power is supplied in the controller 130 may be restricted so as to suppress the operation thereof and to reduce the power consumption. Moreover, it can be contemplated that the suppression of operation is carried out by combining the foregoing to realize the reduction in power consumption.

When the management device 300 performs the remote management of the image forming apparatus 100 through the public telephone network 200, for example, the management device 300 issues a communication request to the image forming apparatus 100. More specifically, in the management device 300, the communicating unit 317 outputs a given AT command (for example, ATDxxxxx) to the modem 301 to call up the modem 101 of the image forming apparatus 100 (SEQ110). The modem 301 dials a call destination corresponding to this AT command that is a telephone number of the modem 101 of the image forming apparatus 100 (SEQ111).

By this calling, a notice of caller number (telephone number of a caller) is delivered and a ringing signal is output to the modem 101 of the image forming apparatus 100 in sequence through the public telephone network 200 (SEQ112). The modem 101, after the above-described initialization, is constantly detecting an incoming call (Step S10). When the ringing signal from the management device 300 is output to the modem 101, the modem 101 detects the incoming call.

When the modem 101 detects the incoming call, the modem 101 determines whether an originator of the incoming call is a predefined prescribed device. More specifically, when the modem 101 detects the incoming call, the modem 101 forwards the caller number delivered with the ringing signal to the sub-CPU 141 of the sub-system 140 (SEQ113). The sub-CPU 141 determines whether the caller number forwarded matches a caller number stored in the remote management system memory 144 (Step S11). If not matched, the sub-CPU 141 issues a request to disconnect the communication to the modem 101.

On the other hand, when the caller number acquired by the incoming call matches the caller number stored in the remote management system memory 144, it can be determined that the originator of the incoming call is the prescribed device. In this case, the sub-CPU 141 determines whether the current operation mode of the image forming apparatus 100 is the energy-saving mode. The current operation mode of the image forming apparatus 100 can be known, for example, by referring to an operation mode flag held in the remote management system memory 144 and determining whether the flag is indicating the energy-saving mode.

When it is determined that the image forming apparatus 100 is in the energy-saving mode, the sub-CPU 141 outputs to the controller 130 a request to return the operation mode from the energy-saving mode to the normal mode (SEQ114), and sets an energy-saving mode return flag to on that is a value indicating that the operation mode is returned to the normal mode (Step S20). The energy-saving mode return flag is stored, for example, in the remote management system memory 144. The controller 130 notifies the sub-system 140 of reception of the request to return from the energy-saving mode at SEQ114 (SEQ115).

When the sub-CPU 141 outputs to the controller 130 the request to return to the normal mode at SEQ114, the sub-CPU 141 further issues a request to the power controller 145 to cancel the suppression of power supply in the energy-saving mode. The power controller 145 controls the PSU 170, in response to the request, to resume the power supply to the controller 130. When the supply of power to the controller 130 is resumed, the controller 130 returns the operation of the units in the controller 130 to the operation in the normal mode (Step S21).

Meanwhile, in the sub-system 140, the sub-CPU 141 issues a command to the modem 101, in parallel with the request to return from the energy-saving mode at SEQ114, to disconnect the line with the management device 300 (SEQ116). When the sub-CPU 141 receives a message "NO CARRIER" indicating that the line has been disconnected by the modem 101 (SEQ117), the sub-CPU 141 issues a request to the modem 101 to dial the caller number held in advance in the remote management system memory 144 that is the telephone number of the modem 301 (the management device 300) (callback, SEQ118).

The modem 101 dials the caller number upon receiving the request (SEQ119). By the dialing, a ringing signal is delivered to the modem 301 of the management device 300 (SEQ120). When the ringing signal is delivered, the modem 301 sends a message RING to the communicating unit 317 (SEQ121). The communicating unit 317 outputs to the modem 301 a given AT command (for example, ATA) for answering an incoming call in response to the message RING (SEQ122). The modem 301, after going off-hook in response to the AT command received (SEQ123), transmits an answer tone to the modem 101 (SEQ124).

When the modem 101 receives the answer tone from the modem 301, negotiation is performed between the modem 101 and the modem 301 (Step S12), and a connection state is established between the modem 101 and the modem 301. When the connection state is established, a message CONNECT indicative of that is sent from the modem 301 to the communicating unit 317 (SEQ125). In a similar manner, a message CONNECT is sent from the modem 101 to the sub-CPU 141 of the sub-system 140 (SEQ126), and is further sent from the sub-CPU 141 to the controller 130 (SEQ127).

When the main CPU 115 in the controller 130 receives the message CONNECT, the main CPU 115 performs communication with the modem 301 of the management device 300 through the public telephone network 200 using the modem 101. The communication allows commands to be exchanged between the image forming apparatus 100 and the management device 300 by SOAP/HTTP communication (Step S13). For example, an exchange in which the management device 300 transmits a request to the image forming apparatus 100 with a command getDeviceControllerInformation and the image forming apparatus 100 responds to the request by collecting status information of the controller 130 is performed.

When the exchange between the management device 300 and the image forming apparatus 100 is finished, in the image forming apparatus 100, the controller 130 issues a request to the sub-system 140 to disconnect the line with the management device 300 (SEQ128). In response to the request, the sub-CPU 141 of the sub-system 140 issues a request to the modem 101 to disconnect the line (SEQ129).

When the sub-system 140 receives the request to disconnect the line from the controller 130 at SEQ128, the sub-system 140 checks the energy-saving mode return flag stored in the remote management system memory 144 (Step S22). As a result, when the value of the energy-saving mode return flag is on, the sub-system 140 issues a request to the controller 130 to change into the energy-saving mode (SEQ130), and issues a request to the power controller 145 to suppress the supply of power to the controller 130. The power controller 145 controls the PSU 170 in response to the request to suppress the supply of power to the controller 130. Consequently, the operation mode is changed into the energy-saving mode (Step S23).

In this example, the sub-system 140 issues a request to the controller 130 to change into the energy-saving mode at the timing that is immediately after checking the energy-saving mode return flag is checked at Step S22. However, it is not limited to this, and the sub-system 140 may output the request to the controller 130 to change into the energy-saving mode at a timing when a predetermined transition time is passed after the energy-saving mode return flag is checked at Step S22.

In this case, for example, the predetermined transition time is stored in advance in the remote management system memory 144. When the sub-CPU 141 checks that the value of the energy-saving mode return flag is on at Step S22, the sub-CPU 141 waits for the transitional time stored in the remote management system memory 144 to elapse and then outputs a request to the controller 130 to change into the energy-saving mode.

Accordingly, outputting a request to change into the energy-saving mode after an elapse of a given time from the disconnection of the line allows the controller 130 to perform various processes necessary for changing into the energy-saving mode before receiving the request to change into the energy-saving mode at SEQ130.

The modem disconnects the line in response to the request to disconnect the line at above-described SEQ129. By the line being disconnected, a message NO CARRIER is sent from the modem 101 to the controller 130 via the sub-CPU 141 (SEQ131, SEQ132). Likewise, in the management device 300, a message NO CARRIER is sent from the modem 301 to the communicating unit 317 (SEQ133).

Process in Embodiment

Figure 6:
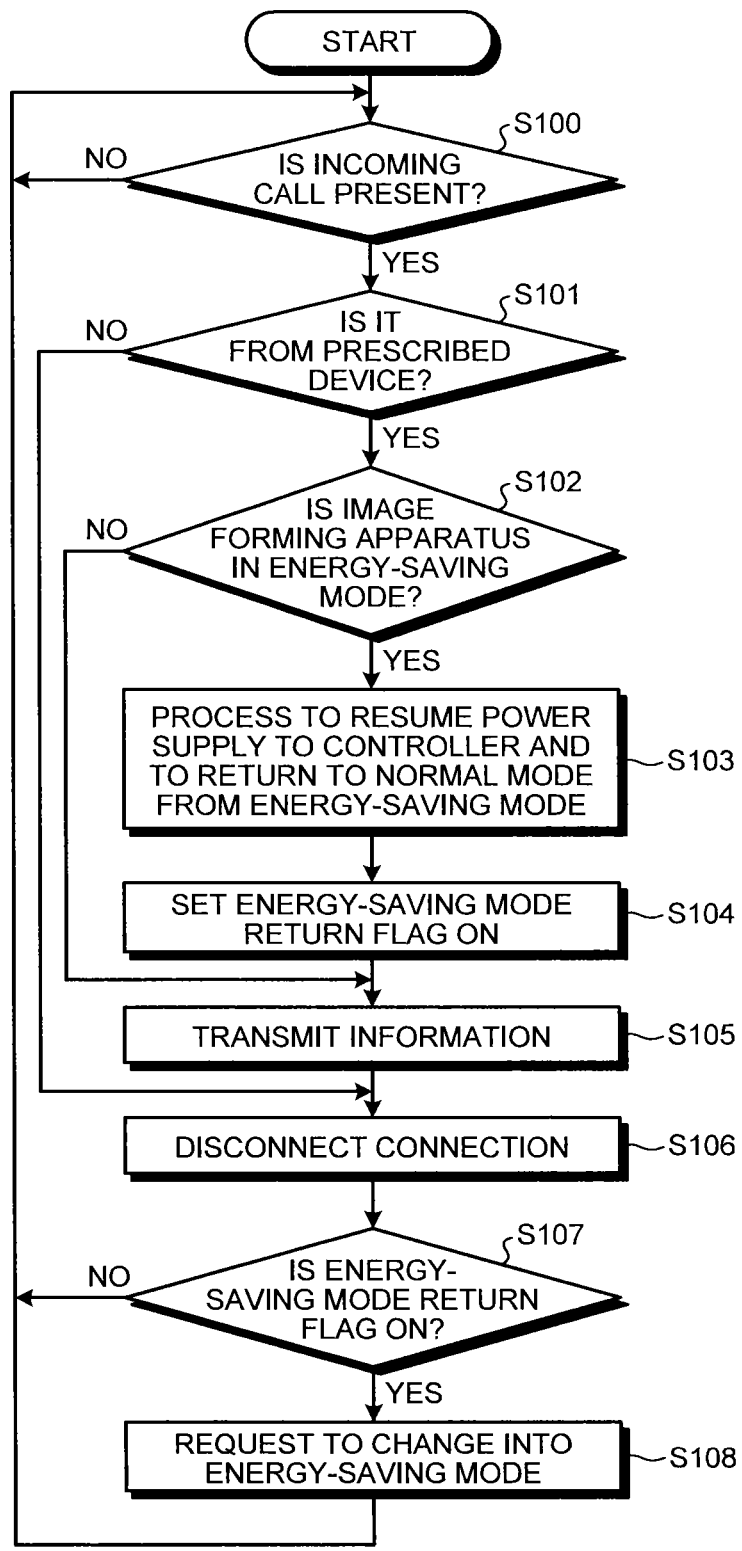
FIG. 6 is a flowchart illustrating an example of a process performed in the image forming apparatus in the embodiment.

FIG. 6 illustrates a flowchart indicating an example of the process performed in the image forming apparatus 100 in the present embodiment. The process in the flowchart is performed in the sub-system 140. Prior to performing the process of the flowchart in FIG. 6, the sub-system 140 initializes the energy-saving mode return flag.

At Step S100, the sub-system 140 waits for an incoming call through the public telephone network 200 to be detected. When an incoming call is detected, the sub-system 140 moves the process on to Step S101 and determines whether the incoming call detected at Step S100 is from a prescribed device. More specifically, in the sub-system 140, the modem 101 acquires a caller number of an originator of the incoming call and forwards it to the sub-CPU 141. The sub-CPU 141 then determines whether the caller number forwarded from the modem 101 matches the caller number stored in advance in the remote management system memory 144.

If the caller number forwarded from the modem 101 does not match the caller number stored in advance in the remote management system memory 144, it can be determined that the incoming call is not from the prescribed device. In this case, the sub-system 140 moves the process on to Step S106 described later.

On the other hand, when the caller number forwarded from the modem 101 matches the caller number stored in advance in the remote management system memory 144, it can be determined that the incoming call is from the prescribed device. Accordingly, the sub-system 140 moves the process on to Step S102 and determines whether the current operation mode of the image forming apparatus 100 is the energy-saving mode. For example, in the sub-system 140, the sub-CPU 141 determines the current operation mode based on the operation mode flag held in the remote management system memory 144. If the current operation mode is the normal mode but not the energy-saving mode, the sub-system 140 moves the process on to Step S105 described later.

Meanwhile, when the current operation mode is the energy-saving mode, the sub-system 140 moves the process on to Step S103. At Step S103, the sub-system 140 resumes the supply of power to the controller 130 to cancel the suppression of operation of the controller 130, and make the operation mode return from the energy-saving mode to the normal mode. More specifically, when the current operation mode is the energy-saving mode, the sub-CPU 141. issues a request to the power controller 145 to cancel the suppression of power supply to the controller 130. The power controller 145 controls the PSU 170 in response to the request and resumes the supply of power to the controller 130. The sub-system 140 then moves the process on to Step S104.

At Step S104, the sub-system 140 sets the value of the energy-saving mode return flag stored in the remote management system memory 144 to on that is the value indicating that the operation mode has been returned to the normal mode from the energy-saving mode.

When the energy-saving mode return flag is set at Step S104, the process is moved on to Step S105. At Step S105, the sub-system 140 transmits status information of the controller 130 to the management device 300. For example, the sub-system 140 acquires the status information held in the remote management system memory 117 of the controller 130, and transmits the status information acquired to the management device 300 through the public telephone network 200 using the modem 101. However, it is not limited to this; for example, the sub-system 140 may issue a request to the controller 130 to collect the status information. When the status information is transmitted, the sub-system 140 moves the process on to Step S106.

At Step S106, the sub-system 140 disconnects the connection through the public telephone network 200. At subsequent Step S107, the sub-system 140 then determines whether the value of the energy-saving mode return flag stored in the remote management system memory 144 is on. If the value of the energy-saving mode return flag is not on, the sub-system 140 returns the process to Step S100.

On the other hand, when the value of the energy-saving mode return flag is on at Step S107, the sub-system 140 moves the process on to Step S108. At Step S108, the sub-system 140 outputs a request to change the operation mode into the energy-saving mode. More specifically, the sub-system 140 outputs a request to the controller 130 to change the operation mode into the energy-saving mode and issues a request to the power controller 145 to suppress the supply of power to the controller 130. The power controller 145 controls the PSU 170 in accordance with the request to suppress the supply of power to the controller 130. Consequently, the operation mode is changed into the energy-saving mode.

When the sub-system 140 changes the operation mode into the energy-saving mode, the sub-system 140 initializes the value of the energy-saving mode return flag and returns the process to Step S100.

As in the foregoing, in accordance with the present embodiment, when the communication from the prescribed device is accepted while the operation mode is the energy-saving mode, the operation mode is returned to the normal mode from the energy-saving mode. After the communication is finished, the operation modes are immediately changed from the normal mode to the energy-saving mode without waiting for a predetermined time to elapse. Consequently, the effect of reduction in power consumption in the energy-saving mode can be further enhanced.

While the present embodiment has been explained to be applied when the communication is performed through the public telephone network 200 in the foregoing, it is not limited to this example. More specifically, the embodiment can be applied when the communication is performed through a LAN or the Internet. In this case, whether a communication sender is a prescribed device can be known, for example, by an Internet Protocol (IP) address.

For example, considered is a situation in which the management device 300 and the image forming apparatus 100 are connected through a LAN. On the side of the management device 300, a NIC not illustrated connecting with the communicating unit 317 is connected to the LAN. On the side of the image forming apparatus 100, a NIC 102 is connected to the LAN. Upon receiving the communication from the management device 300 through the LAN while the image forming apparatus 100 is in the energy-saving mode, the image forming apparatus 100 changes the operation modes from the energy-saving mode to the normal mode. When the communication with the management device 300 is finished, the image forming apparatus 100 then changes the operation modes from the normal mode to the energy-saving mode immediately without waiting for a predetermined time to elapse. Even in this example, because the operation mode is immediately changed into the energy-saving mode from the normal mode, the effect of reduction in power consumption in the energy-saving mode can be further enhanced.

Modification Example of Embodiment

Figure 7:
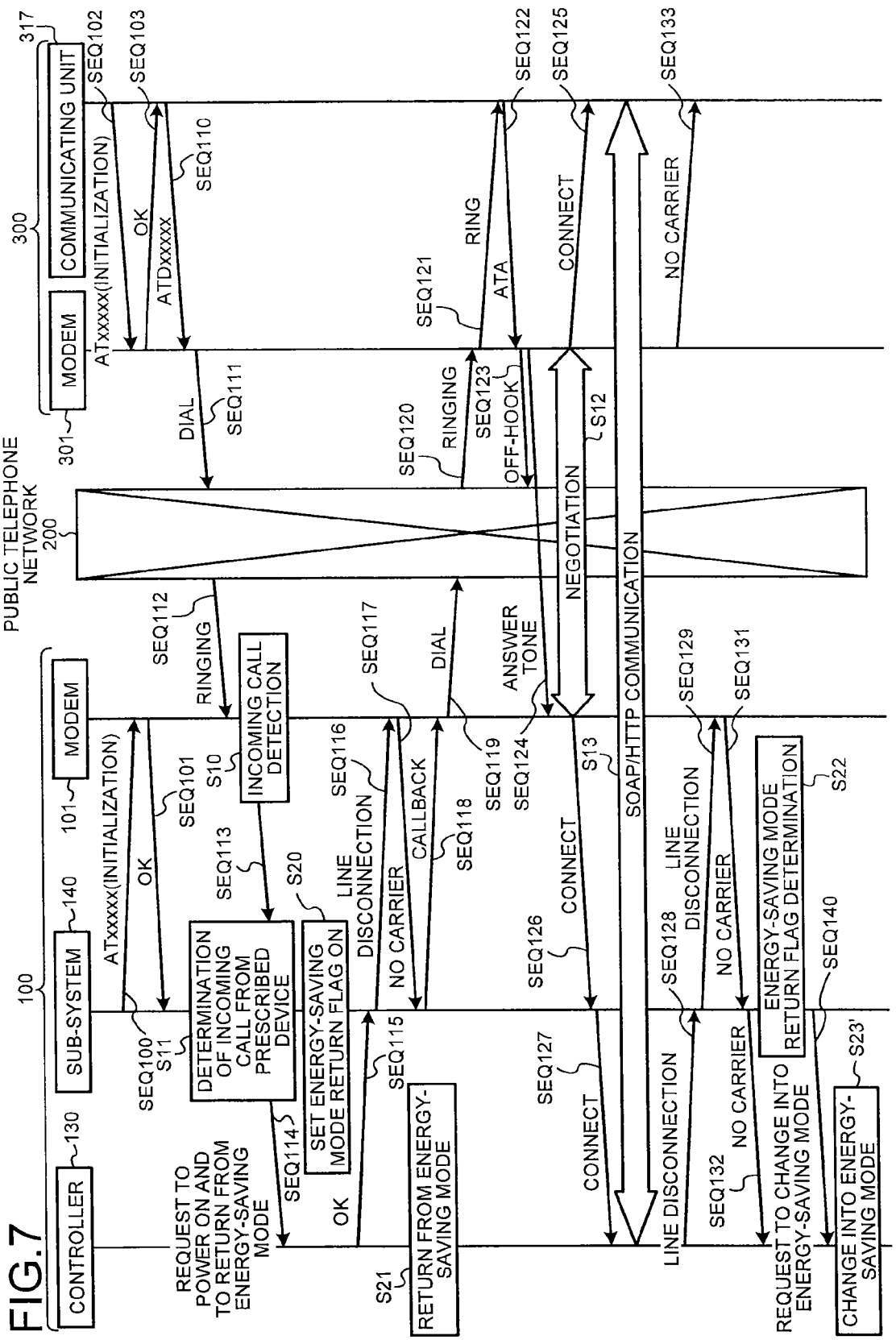
FIG. 7 is a sequence diagram illustrating an example of a communication procedure performed between the management device and the image forming apparatus according to a modification example of the embodiment.
Figure 8:
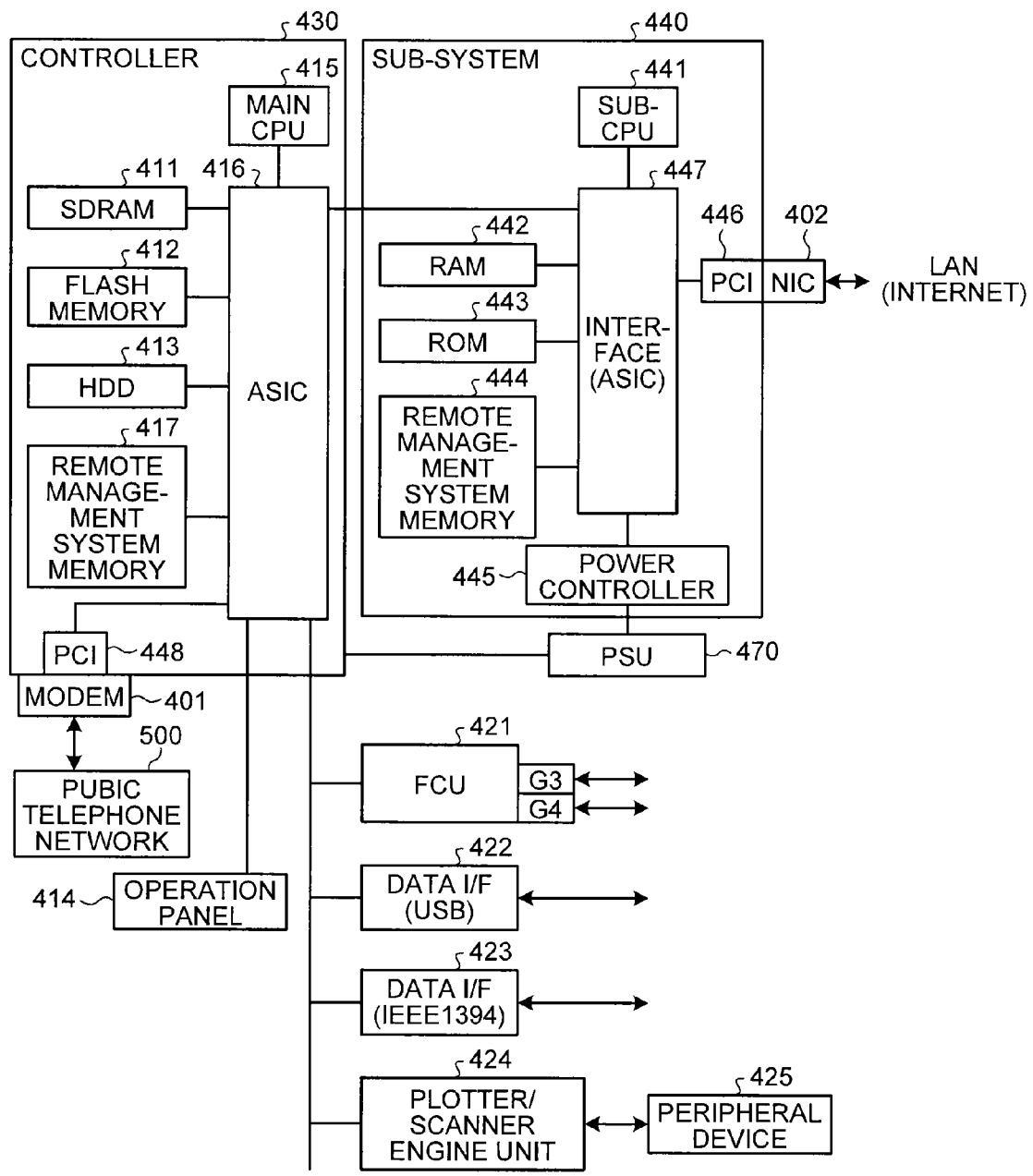
FIG. 8 is a block diagram illustrating an example of a configuration of an image forming apparatus in conventional technology.

Next, a modification example of the above-described embodiment will be described. FIG. 7 illustrates an example of a communication procedure performed between the management device 300 and the image forming apparatus 100 in the modification example. In FIG. 7, the portions common to those in the above-described communication procedure in FIG. 5 are given with the same reference numerals, and their detailed explanations are omitted. In the modification example, because the configurations of the remote management system, the management device 300, and the image forming apparatus 100 explained with reference to FIGS. 1 to 4 and the process explained with reference to FIG. 6 can be used as-is, their detailed explanations are omitted.

In the above-described embodiment, as explained with reference to FIG. 5, after the operation mode is returned to the normal mode by the communication with the management device 300, the sub-system 140 outputs to the controller 130 a request to change the operation mode into the energy-saving mode immediately after the line of the communication performed with the management device 300 is disconnected (SEQ130 in FIG. 5).

In contrast, in the modification example, as illustrated as Step S23' in FIG. 7, the sub-system 140 changes the operation mode into the energy-saving mode at a timing that is after a message NO CARRIER is received at SEQ131.

More specifically, when the sub-system 140 receives the message NO CARRIER from the modem 101, the sub-system 140 sends the message NO CARRIER received to the controller 130 (SEQ132), and checks the energy-saving mode return flag stored in the remote management system memory 144 (Step S22). As a result, if the value of the energy-saving mode return flag is on, the sub-system 140 issues a request to the controller 130 to change into the energy-saving mode (SEQ140). In response to the request, the controller 130 changes the operation mode into the energy-saving mode (Step S23'). At the same time, the sub-system 140 issues a request to suppress the supply of power to the controller 130. The power controller 145 controls the PSU 170 in response to the request so as to suppress the supply of power to the controller 130.

Even in the modification example, as the same as that in the above-described embodiment, the timing of the sub-system 140 to output a request to change into the energy-saving mode to the controller 130 is not limited to that of immediately after the energy-saving mode return flag is checked at Step S22, but may be defined at a point in time after a predetermined transition time is passed from the checking.

In this case, for example, the predetermined transition time is stored in advance in the remote management system memory 144. When the sub-CPU 141 confirms that the value of the energy-saving mode return flag is on at Step S22, the sub-system 140 waits for the transition time stored in the remote management system memory 144 to elapse and then outputs to the controller 130 the request to change into the energy-saving mode.

Because the process of changing into the energy-saving mode is started after the message NO CARRIER is received, a situation in which the line is disconnected by an unexpected cause such as a communication error can be dealt with.

According to the present invention, when returning from the energy-saving mode that is caused by the communication from an external device, the energy-saving can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device having, as operation modes, a first mode and a second mode reduced in power consumption from the first mode, the electronic device comprising:

a main unit, an operation of which is suppressed in the second mode; and a sub-unit that includes:
  a communicating unit that performs communication via a communication line;
  an operation mode controller that changes the operation mode from the second mode to the first mode when communication with a predefined prescribed device is requested during the second mode and that changes the operation mode from the first mode to the second mode at a timing corresponding to termination of the communication; and
  a remote management system memory that stores in advance a predetermined transition time,
wherein the operation mode controller changes the operation mode from the second mode to the first mode only when the operation mode controller determines that an originator of an incoming call requesting the communication is from the predefined prescribed device, and
wherein, when the sub-unit confirms that a value of a flag to return to the second mode has been set or is set, the sub-unit waits for the predetermined transition time stored in the remote management system memory to elapse, and, responsive to elapse of the predetermined transition time, outputs a request to the main unit for the main unit to change to the second mode.

2. The electronic device according to claim 1, wherein the operation mode controller changes the operation modes from the first mode to the second mode after notifying the predefined prescribed device of termination of the communication and after outputting the request to the main unit for the main unit to change into the second mode, which is output responsive to elapse of the predetermined transition time.

3. The electronic device according to claim 1, wherein the operation mode controller changes the operation modes from the first mode to the second mode after being notified of termination of the communication with the predefined prescribed device and after outputting the request to the main unit for the main unit to change into the second mode, which is output responsive to elapse of the predetermined transition time.

4. The electronic device according to claim 1, wherein the operation mode controller changes the operation mode from the first mode to the second mode immediately after elapse of the predetermined transition time.

5. The electronic device according to claim 1, wherein the operation mode controller changes the operation mode from the first mode to the second mode at a point in time when the predetermined transition time has elapsed after the timing.

6. The electronic device according to claim 1, wherein the communicating unit performs the communication using a public telephone network.

7. The electronic device according to claim 1, wherein the operation mode controller determines that an originator of an incoming call requesting the communication is from the predefined prescribed device responsive to a positive comparison result of identification information regarding the incoming call to identification stored in the remote management system memory.

8. The electronic device according to claim 1, wherein, to switch from the first mode to the second mode, the sub-unit issues a request to suppress the supply of power to the main unit.

9. A computer program product comprising a non-transitory computer-readable medium including a computer program for controlling an electronic device having, as operation modes, a first mode and a second mode reduced in power consumption from the first mode and including a main unit an operation of which is suppressed in the second mode, and a sub-unit including a processor that executes the computer program, the computer program, when executed by the processor, causing the processor to perform a method comprising:
  performing communication via a communication line;
  changing the operation mode from the second mode to the first mode to perform communication when communication with a predefined prescribed device is requested during the second mode; and
  changing the operation mode from the first mode to the second mode at a timing corresponding to termination of the communication, said changing from the first mode to the second mode including confirming that a value of a flag to return to the second mode has been set or is set, waiting for a predetermined transition time stored in a remote management system to elapse, and, responsive to elapse of the predetermined transition time, changing to the second mode,
  wherein said changing the operation mode from the second mode to the first mode is performed only responsive to a determination that an originator of an incoming call requesting the communication is from the predefined prescribed device.

10. The computer program product according to claim 9, wherein the determination that an originator of an incoming call requesting the communication is from the predefined prescribed device is based on a positive comparison result of identification information regarding the incoming call to identification stored in the remote management system memory.

11. The computer program product according to claim 9, wherein, to switch from the first mode to the second mode, the sub-unit issues a request to suppress the supply of power to the main unit.

* * * * *